Nov. 15, 1932.                J. N. HORNBAKER                1,888,170
                                DIGGING IMPLEMENT
                          Filed March 16, 1932          2 Sheets-Sheet 1
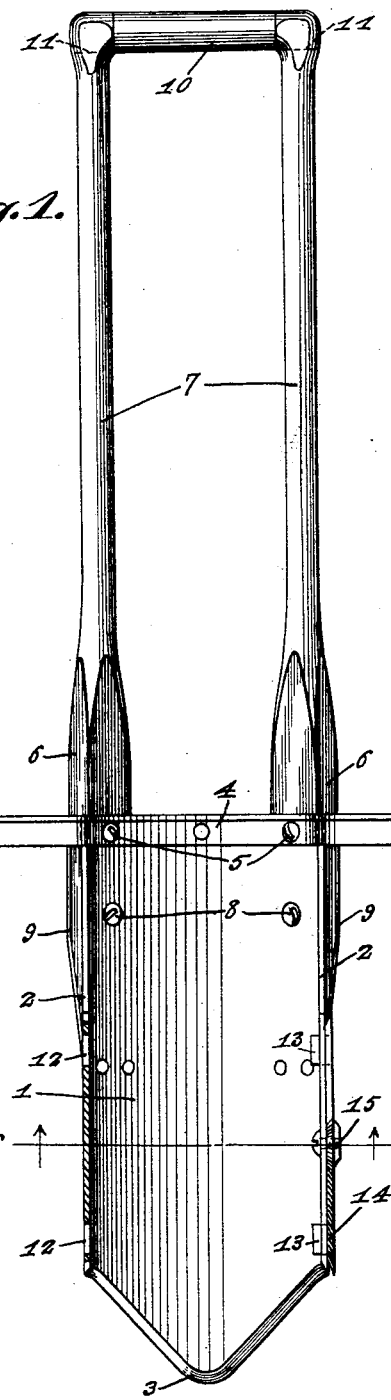
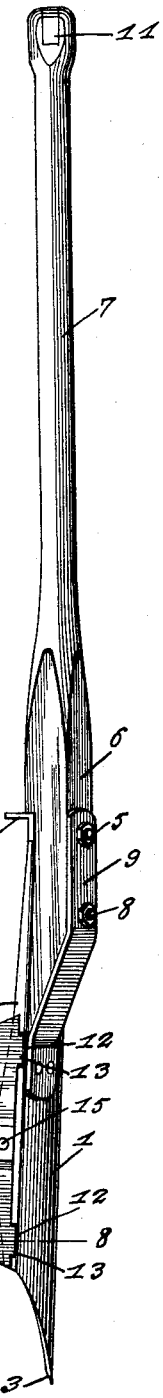
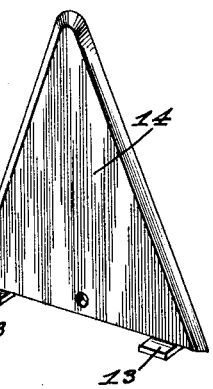
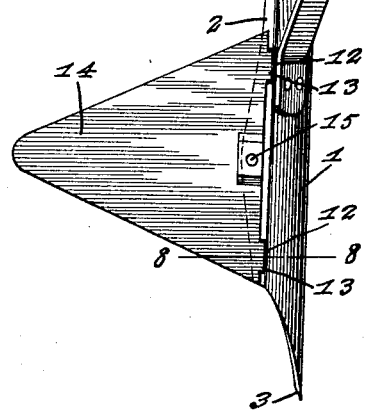
J. N. Hornbaker, INVENTOR
BY Victor J. Evans & Co.
ATTORNEY Nov. 15, 1932.    J. N. HORNBAKER    1,888,170
DIGGING IMPLEMENT
Filed March 16, 1932    2 Sheets-Sheet 2
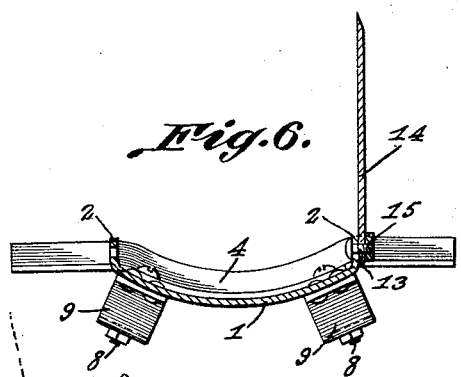
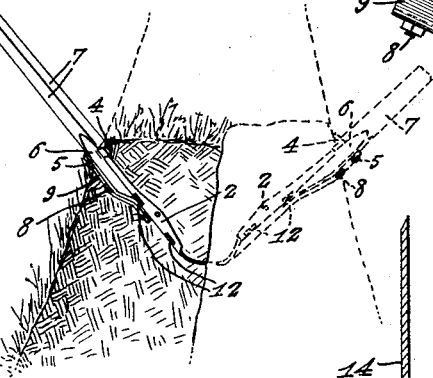
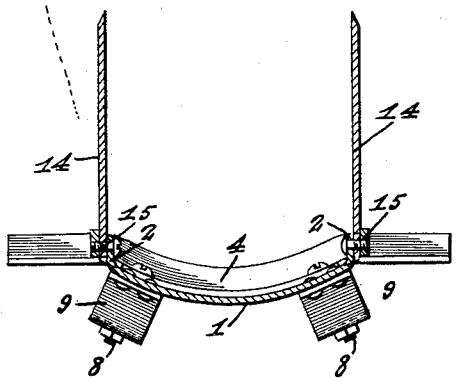
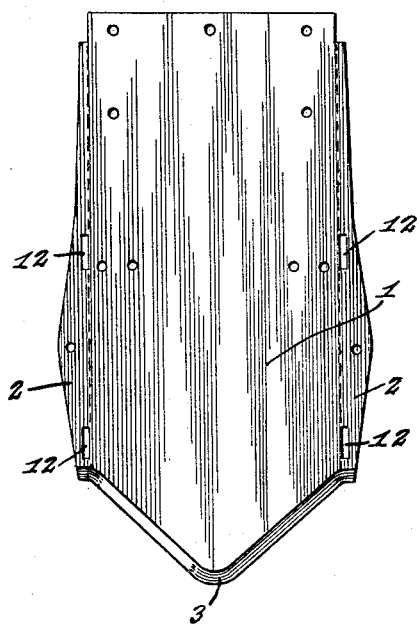
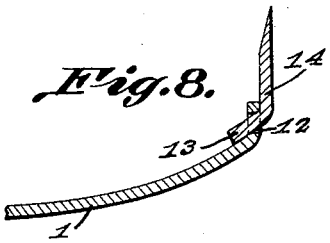
J. N. Hornbaker, INVENTOR
BY Victor J. Evans & Co.
ATTORNEY Patented Nov. 15, 1932

1,888,170

UNITED STATES PATENT OFFICE

JOSEPH N. HORNBAKER, OF ST. PETERSBURG, FLORIDA

DIGGING IMPLEMENT

Application filed March 16, 1932. Serial No. 599,282.

This invention relates to digging implements and its general object is to provide an implement practically in the form of a spade that is capable of digging a ditch or trench of great width through heavy growth and root laden earth in an easy and expeditious manner with very little effort and labor, and in minimum time, without the use of other tools.

A further object of the invention is to provide a digging implement that is easy to handle, does not become clogged in wet or moist earth, can be freely dumped, and is capable of handling a large mass of earth in a single operation.

Another object of the invention is to provide a digging implement of the character set forth, that is simple in construction, inexpensive to manufacture and extremely efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, in which:—

Figure 1 is a front view illustrating the implement which forms the subject matter of the present invention.

Figure 2 is a side view thereof.

Figure 3 is a perspective view illustrating the implement in use.

Figure 4 is a perspective view of one of the side blades.

Figure 5 is a top plan view illustrating a complete blank from which the body of the tool is provided.

Figure 6 is a sectional view taken approximately on line 6—6 of Figure 1, looking in the direction of the arrows.

Figure 7 is a similar view illustrating the application of two side blades.

Figure 8 is a sectional view taken approximately on line 8—8 of Figure 2, looking in the direction of the arrows.

Referring to the drawings in detail, the reference numeral 1 indicates the body or spade blade of my implement, which as shown is elongated in formation and is provided with lateral flanges 2 that are relatively wide for a portion of their length adjacent the lower end of the body blade and from their widest portion they taper in opposed directions, and are relatively narrow at the upper portion of the body blade as clearly shown in Figure 5 which discloses a blank of the body blade and its flanges. The flanges are arranged at right angles with respect to the body blade which is arcuate shape in cross section and is provided with a beveled lower cutting edge 3 that is of substantially V-shaped formation.

Secured to the upper edge of the body blade is a right angle strip 4 that is provided with an intermediate portion shaped to follow the curvature of the body blade and is fixed thereto through the instrumentality of bolt and nut connections 5, the bolts of which extend through the enlarged lower ends 6 of the handle bars 7. It will be noted that the enlarged portions of the handle bars are recessed to receive the body blade and strip 4 as clearly shown in Figure 2. The angle strip 4 extends beyond the sides of the body blade, and these extending ends provide foot receiving means for the purpose of urging the implement within the earth as will be apparent. The right angle strip 4 not only provides foot engaging means, but materially reinforces the upper portion and edge of the body blade, and of course the portion of the angle strip 4 between the handle bars can likewise be used as foot receiving means. It will be further noted that the right angle strip 4 is secured to the body blade through the instrumentality of a rivet and extends centrally through the strip as clearly shown in Figure 1.

The enlarged lower ends of the handle bars are square in cross section and have beveled lower edges, and the enlarged lower ends are likewise fixed to the body blade by bolt and nut connections 8. Riveted or otherwise secured to the body blade are wear or reinforcing plates 9 that are disposed in contacting engagement with the enlarged portions of the handle bars and are secured thereto through the medium of the bolt and nut connections 5 and 8.

The plates 9 are arranged on the rear face of the enlarged portions of the handle bars, which extend from the body blade in parallelism with each other and have secured to the upper ends thereof a cross bar 10 which may be provided with tongues 11 on the ends thereof to fit within grooves formed in the upper ends of the handle bars as best shown in Figure 2.

Arranged in each of the flanges 2 at their juncture with the body blade are superposed longitudinally arranged slots 12 that are adapted to receive tongues 13 formed on the straight edge of substantially triangular shaped side blades 14. The tongues 13 are disposed at an angle with respect to the side blades 14 and the latter when fixed to the flanges 2 are disposed at right angles thereto.

Cooperating with the tongue and slot connections for the side blades is a bolt and nut connection 15, and while I have shown two side blades 14 carried by the body blade through the instrumentality of the flanges 2, I generally employ only one blade for digging trenches and ditches in a manner which will be presently described. However, two can be used for some purposes, if desired, as shown in Figure 7. The side blades are formed with beveled upper and lower edges and these edges merge into each other about the apex of the side blades as clearly shown in Figure 4.

While my implement is primarily designed for digging trenches and ditches in swampy land, I want it understood that it can be used for any desired purpose. In the use of my implement in digging a trench or ditch through swampy land which is generally provided with heavy growth and root laden earth, the side flanges are removed, and the body blade is used for cutting downwardly or at an angle in a straight line along the surface of the ground. This cutting operation is continued for a short distance, or as far as desired, then one of the side blades is attached to the body blade. The implement is then inserted in the ground at an angle and at a point parallel with but laterally of the first cut, by the application of the feet of the operators upon the extended ends of the angle strip or the intermediate portion thereof. This action is followed quickly by a forward movement of the handle to loosen the mass of earth above the body blade, and with the weight of the operators again thrown on the angle strip or foot bar, the blade is forced into the soil to its full length. The operators then grasp the outer ends of the handle bars and throw sufficient weight upon it to lift the mass upward as suggested in Figure 3. The blades are then withdrawn in a backward direction and tilted sideways in the direction of the side blade, and the mass of earth is quickly thrown out to the side of the proposed trench or ditch.

When one side of the ditch or trench is dug or cut out as above described, any distance desired, the operators start on the opposite side to complete the same, and proceed in the manner set forth. While it is possible for one operator to use the implement especially in digging small ditches or trenches, the work can be accomplished with greater ease when two operators are employed, as in fact, the implement is designed especially for two operators.

By beveling the lower edge of the body blade and the outer edges of the side blades, it will be apparent that my implement is capable of cutting through heavy growth as well as the roots of trees and the like, and by employing a single side blade as shown in Figure 6, the implement will not become clogged with earth as readily, as if both side blades were used as shown in Figure 7, with the result in ditch and trench digging it is preferred that a single side blade be used especially if the earth is moist or wet.

Due to the detachability of the side blades, it will be obvious that they can be changed from side to side of the body blade in accordance with the users' desires, and this feature is extremely advantageous where only one side blade is used and some of the operators are left-handed while others are right-handed.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A digging implement comprising a body blade curved transversely upon itself and being provided with a lower beveled cutting edge, flanges formed with the sides of the body blade and having slots disposed therein, side blades adapted to be detachably secured to the body blade, tongues formed with said side blades and received in said slots, a foot receiving strip secured to the upper edge of the body blade and a handle for said implement.

2. A digging implement comprising a body blade having a substantially V-shaped cutting edge at its lower end, slotted flanges formed with the side edges of the body blade, side blades including means received in the slots of the flanges, means cooperating with the first mentioned means for detachably securing the side blades to the flanges, a foot receiving strip of right angle formation secured to the upper edge of the body blade and extending beyond the side edges thereof, handle bars having enlarged lower portions provided with inclined rear faces extending into the body, said enlarged lower portions being fixed to the body blade, and having recessed front faces receiving the body blade and foot receiving strip, combined wear and reinforcing plates shaped to follow the inclination of the rear faces of the enlarged portions and secured to the rear faces and body blade respectively, and a cross bar bridging the upper ends of the handle bars.

In testimony whereof I affix my signature.

JOSEPH N. HORNBAKER.